(12) United States Patent
He et al.

(10) Patent No.: US 8,839,022 B2
(45) Date of Patent: Sep. 16, 2014

(54) MACHINE-TO-MACHINE PLATFORM SERVICE PROCESSING METHOD AND MACHINE-TO-MACHINE PLATFORM

(75) Inventors: Yue He, Shenzhen (CN); Gang Zheng, Shenzhen (CN); Changjun Zhao, Shenzhen (CN); Liang Meng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 177 days.

(21) Appl. No.: 13/574,771

(22) PCT Filed: Mar. 17, 2011

(86) PCT No.: PCT/CN2011/071907
§ 371 (c)(1),
(2), (4) Date: Jul. 23, 2012

(87) PCT Pub. No.: WO2012/009979
PCT Pub. Date: Jan. 26, 2012

(65) Prior Publication Data
US 2012/0290872 A1 Nov. 15, 2012

(30) Foreign Application Priority Data
Jul. 21, 2010 (CN) .......................... 2010 1 0233072

(51) Int. Cl.
*G06F 11/00* (2006.01)
*H04W 4/00* (2009.01)

(52) U.S. Cl.
CPC ..................................... *H04W 4/005* (2013.01)
USPC ........................................... 714/4.11; 714/15

(58) Field of Classification Search
CPC .................... G06F 11/2294; G06F 11/2205
USPC ............ 714/4.1, 4.11, 4.12, 4.2, 4.21, 4.3, 15
See application file for complete search history.

(56) References Cited

U.S. PATENT DOCUMENTS

| | | | |
|---|---|---|---|
| 6,898,278 B1 * | 5/2005 | Li et al. .......................... | 379/325 |
| 6,898,631 B1 * | 5/2005 | Kraft et al. .................... | 709/224 |
| 7,991,840 B2 * | 8/2011 | Boyer et al. .................. | 709/205 |
| 8,161,055 B2 * | 4/2012 | Seager et al. ................. | 707/754 |
| 2008/0153521 A1 * | 6/2008 | Benaouda et al. ............ | 455/466 |

FOREIGN PATENT DOCUMENTS

| CN | 101730123 | 6/2009 |
|---|---|---|
| CN | 101902681 | 12/2010 |

OTHER PUBLICATIONS

Liu, Wen Jie "M2M System Structure and Development" Communications Management and Technology, Apr. 2009, No. 4, pp. 40-42 (China Academic Journal Electronic Publishing House).
PCT International Search Report, dated Jun. 23, 2011 for PCT/CN2011/071907.

* cited by examiner

*Primary Examiner* — Dieu-Minh Le
(74) *Attorney, Agent, or Firm* — Foley & Lardner LLP

(57) ABSTRACT

A method for processing Machine-to-Machine (M2M) platform services and a M2M platform are disclosed. The method comprises: receiving a service request sent by a terminal; selecting a corresponding application according to capacity required by the service request; and forwarding the service request to the corresponding application, and feeding back a response result of the application to the terminal. The method for processing M2M platform services and the M2M platform in accordance with the present implement a platform for providing a variety applications for users.

8 Claims, 5 Drawing Sheets

MACHINE-TO-MACHINE PLATFORM SERVICE PROCESSING METHOD AND MACHINE-TO-MACHINE PLATFORM

TECHNICAL FIELD

The present invention relates to the field of M2M technologies, and in particular, to a method for processing Machine-to-Machine (M2M) platform services and a M2M platform.

BACKGROUND OF THE RELATED ART

Internet of Things is a huge network which formed by combining various information sensing devices such as radio frequency identification devices, infrared sensors, global positioning systems, laser scanners, home appliances, security-monitoring equipment and the like with the Internet. All items within the Internet of Things are connected with the network together so as to facilitate identification, management and monitoring and to achieve integration of applications on this basis, finally providing ubiquitous omnibearing services for people.

With increasingly quick paces of transformation of operators, simply providing communication channels can not meet requirements of mobile users any more. Through standardization of applications of the Internet of Things, such as intelligent home, vehicle monitoring and the like, the operators perform platform construction using their own networks, and then operate by means of rental services or outsourcing, thus providing greater profits for mobile users.

Operation and support platforms (M2M) of the Internet of Things provides application solutions of services and industries for mobile users by supporting standardized applications, and provides standardized information channels for enterprise applications such that enterprises' self-developed industry applications can access to the mobile network more conveniently. However, the current M2M platforms can only provide one-to-one services, that is, only one application can be provide to a mobile client, thus restricting the application scope of the mobile users.

SUMMARY OF THE INVENTION

One embodiment of the present invention provides a method for processing M2M platform services comprising:
receiving a service request sent by a terminal;
selecting a corresponding application according to capacity required by the service request; and
forwarding the service request to the corresponding application, and feeding back a response result of the application to the terminal.

Preferably, selecting the corresponding application according to the capacity required by the service request comprises:
analyzing the capacity required by the service request;
searching the corresponding application from a queue of the capacity.

Preferably, selecting the corresponding application according to the capacity required by the service request comprises:
selecting the corresponding application according to weight or load balancing when there is a plurality of corresponding applications;
when the selected corresponding application fails, disabling the application until the application returns to normal, and selecting a spare application.

Preferably, the capacity includes bearing capacity and/or service capacity and/or processing capacity.

Preferably, the method for processing M2M platform services further comprises:
receiving a login request initiated by the application, the login request including the capacity supported by the application;
inserting the application into the queue of the capacity supported by the application. One embodiment of the present invention also provides a M2M platform comprising:
a receiving module configured to receive a service request sent by a terminal;
a selecting module configured to select a corresponding application according to capacity required by the service request; and
a forwarding module configured to forward the service request to the corresponding application and feed back a response result of the application to the terminal.

Preferably, the selecting module comprises:
an analysis unit configured to analyze the capacity required by the service request; and
a searching unit configured to search the corresponding application from a queue of the capacity.

Preferably, the selecting module further comprises:
a selecting unit configured to select the corresponding application according to weight or load balancing when there is a plurality of corresponding applications; and
a disabling unit configured to, when the selected corresponding application fails, disable the application until the application returns to normal, and select a spare application.

Preferably, the capacity includes bearing capacity and/or service capacity and/or processing capacity.

Preferably, the M2M platform further comprises:
a login module configured to receive a login request initiated by the application, the login request including the capacity supported by the application; and
an inserting module configured to insert the application into the queue of the capacity supported by the application.

The method for processing M2M platform services and the M2M platform in accordance with the embodiments of the present invention can process a service request by selecting an appropriate application from a queue of capacity such that a terminal can uses a variety of applications.

PREFERRED EMBODIMENTS OF THE PRESENT INVENTION

A main object of the present invention is to provide a method for processing M2M platform services and a M2M platform so as to implement a platform for providing a various applications for users.

Implementation of objects, functional features and advantages of embodiments of the present invention will be further described in detail in combination with embodiments and with reference to accompanying drawings.

A method for processing M2M platform services and a M2M platform in accordance with the embodiments of the present invention can process a service request by selecting an appropriate application from a queue of capacity such that a terminal can uses a variety of applications.

Figure 1:
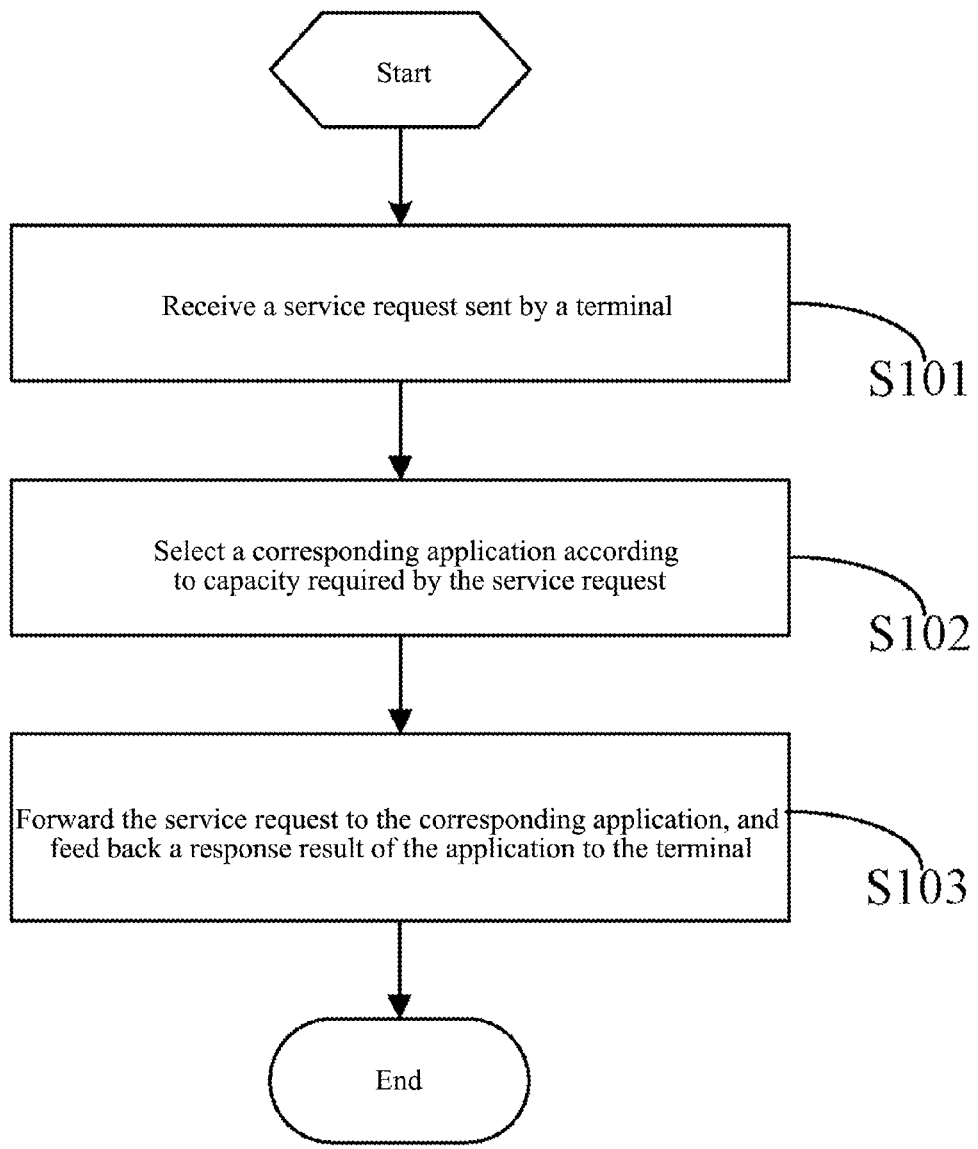
FIG. 1 is a flow chart of a method for processing M2M platform services in accordance with one embodiment of the present invention.

Referring to FIG. 1, a method for processing M2M platform services in accordance with one embodiment of the present invention comprises the following steps.

In step S101, a service request sent by a terminal is received.

In step S102, a corresponding application is selected according to capacity required by the service request.

Specifically, the step S102 comprises:

analyzing the capacity required by the service request;

searching the corresponding application from a queue of the capacity.

selecting the corresponding application according to weight or load balancing when there is a plurality of corresponding applications; and when the selected corresponding application fails, disabling the application until the application returns to normal, and selecting a spare application.

In step S103, the service request is forwarded to the corresponding application, and a response result of the application is fed back to the terminal.

The capacity described above includes bearing capacity and/or service capacity and/or processing capacity.

Figure 2:
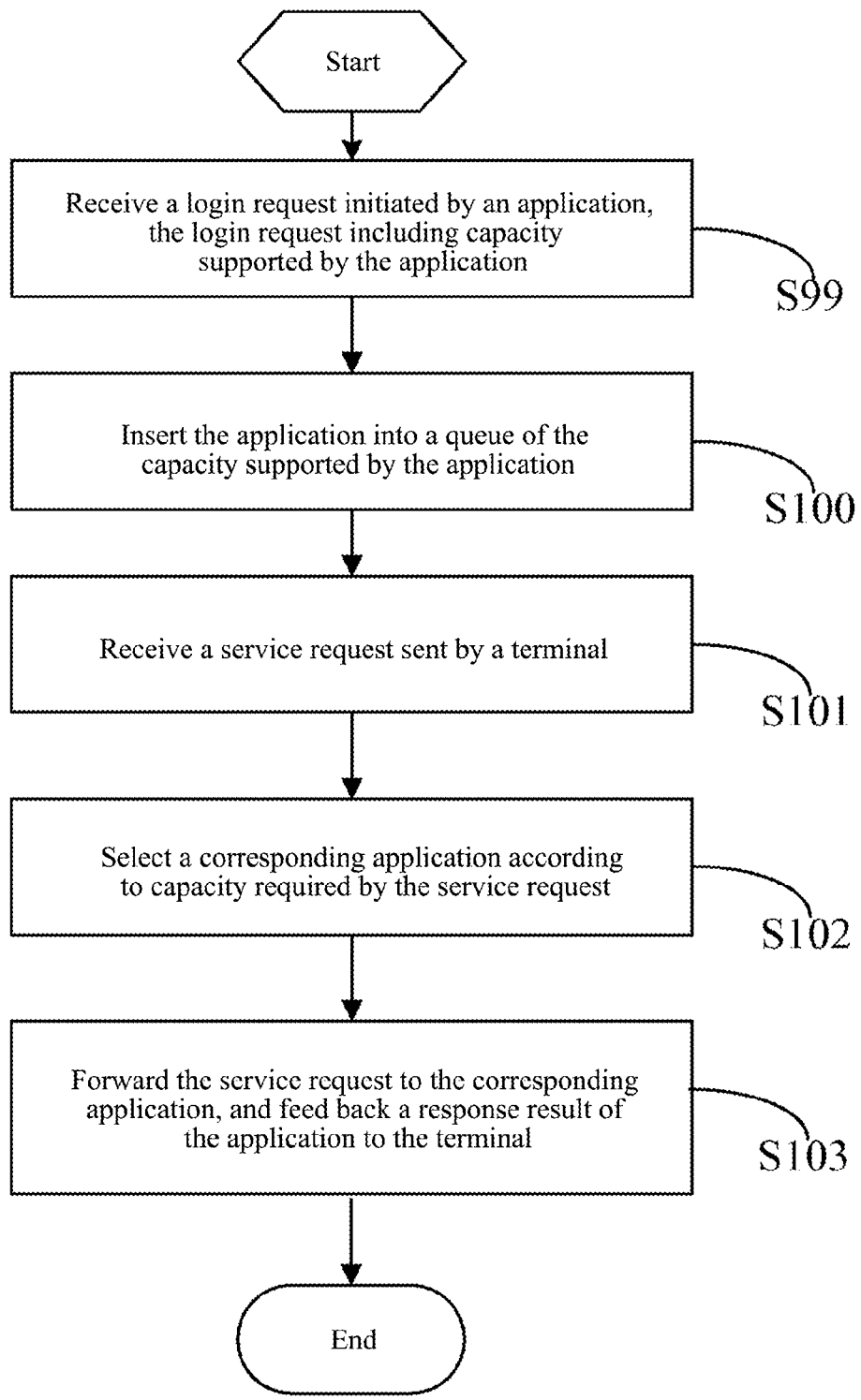
FIG. 2 is a flow chart of a method for processing M2M platform services in accordance with another embodiment of the present invention.

Referring to FIG. 2, a method for processing M2M platform services in accordance with another embodiment of the present invention is shown. Before the step S101 of the aforementioned embodiment, the method further comprises the following steps.

In step S99, a login request initiated by the application is received, the login request including the capacity supported by the application In step S100, the application is inserted into the queue of the capacity supported by the application.

Figure 3:
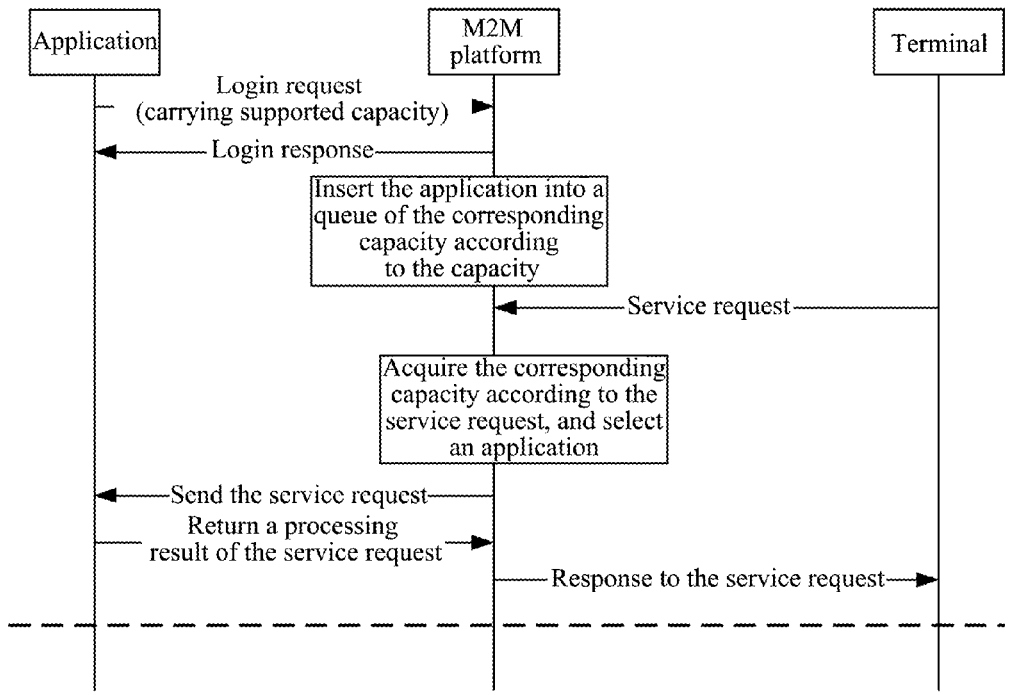
FIG. 3 is a signaling flow chart of a method for processing M2M platform services in accordance with one embodiment of the present invention.

Referring to FIG. 3, the working principle of the method for processing M2M platform services in accordance with the embodiment of the present invention is described in detail.

An administrator of a M2M Platform predefines a set of capacities of various applications, which can comprise a plurality of subsets, such as, bearing capacity (IP-based, short messages-based, and the like), service capacity (a list of processable service capacity) and processing performance (the number of short messages processed, the number of service requests processed).

The M2M platform receives a login request initiated by an application, and capacity supported by the application is carried in the login request. The M2M platform returns a login response to the application after receiving the login request initiated by the application.

The application is inserted into a queue of the corresponding capacity according to the capacity supported by the application. The M2M platform assigns the default capacity, which is predefined, to the application if the capacity is not contained in the application upon login, and then inserts the application into the queue of the corresponding capacity. The application is inserted into the queue of each capacity if the application has many capacities.

The M2M platform receives a service request (service type, bearing type, priority weight and so like) initiated by a terminal, and determines the required capacity (service capacity, bearing capacity, processing performance and so like) according to the service request.

A set of applications are acquired from the queue of the corresponding capacity according to the required capacity, and the application meeting the requirement is selected according to a selection algorithm. When there is a one-to-one corresponding relationship between the service request and the selected application, the application is selected normally to process the service request so as to satisfy service requests of the terminal most appropriately. When there is a one-to-many corresponding relationship between the service request and the selected applications, the M2M platform can select an application meeting the requirement according to weight ranking of the application such as biding ranking or application load capacity ranking of a provider of the application.

When the selected application is disabled (link breaking, no response, overload threshold), the M2M platform further extracts the required capacity based on the service request, and selects an application from a queue of the capacity as a spare application. In the case that the selected application fails, the M2M platform can disable this application from the queue of the capacity to guarantee that the failed application is no longer selected until the application returns to normal when subsequent service requests are processed.

The M2M platform refuses the service request of the terminal if no application meeting the service request is selected.

If an appropriate application is selected, the M2M platform sends a service request to the corresponding application.

The application returns a response (Ack) message of processing result of the service request to the M2M platform.

The M2M platform sends a response to the service request to the terminal according to the response result of the application.

Figure 4:
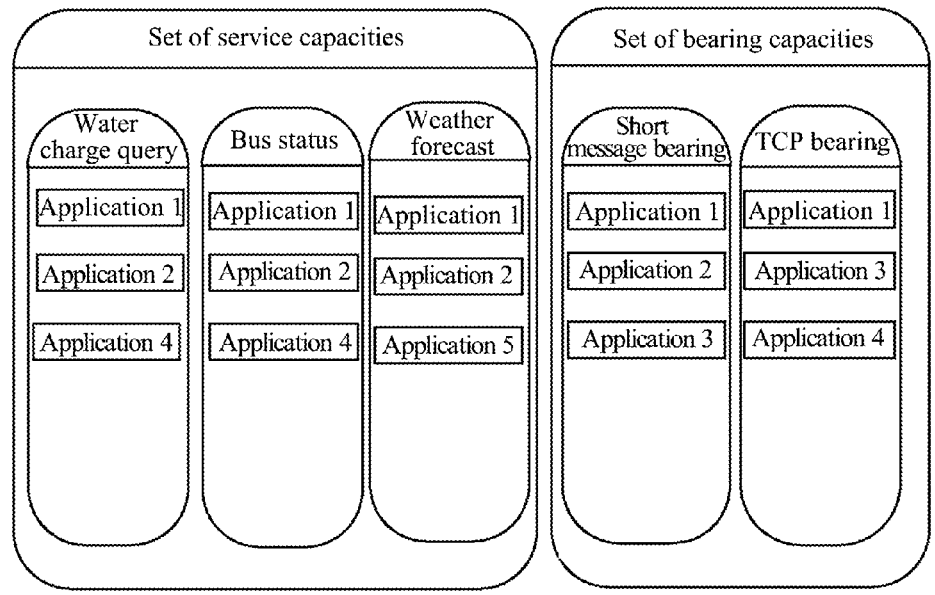
FIG. 4 is a schematic diagram of a queue of capacity in a M2M platform used in a method for processing M2M platform services in accordance with one embodiment of the present invention.

Referring to FIG. 4, a typical case of this embodiment is further described. A terminal initiates Service request 1, and determines the required capacity according to Service request 1. Service request 1 in this embodiment needs three capacities, water charge query, TCP (Transmission Control Protocol) bearing and tariff priority. According to the requirements for the three capacities, the M2M platform acquires a set of applications, i.e., Application 1 and Application 4, from the queue of the corresponding capacity, and selects application 1 meeting the requirements based on the selection algorithm.

The M2M platform sends Service request 1 to Application 1, which returns a response (Ack) message of processing result of the service request to the M2M platform after receiving Service request 1. The M2M platform sends a response to the terminal according to the response to Application 1.

The method for processing M2M platform services in accordance with the embodiment of the present invention can process a service request by selecting an appropriate application from a queue of capacity such that a terminal can uses a variety of applications.

Figure 5:
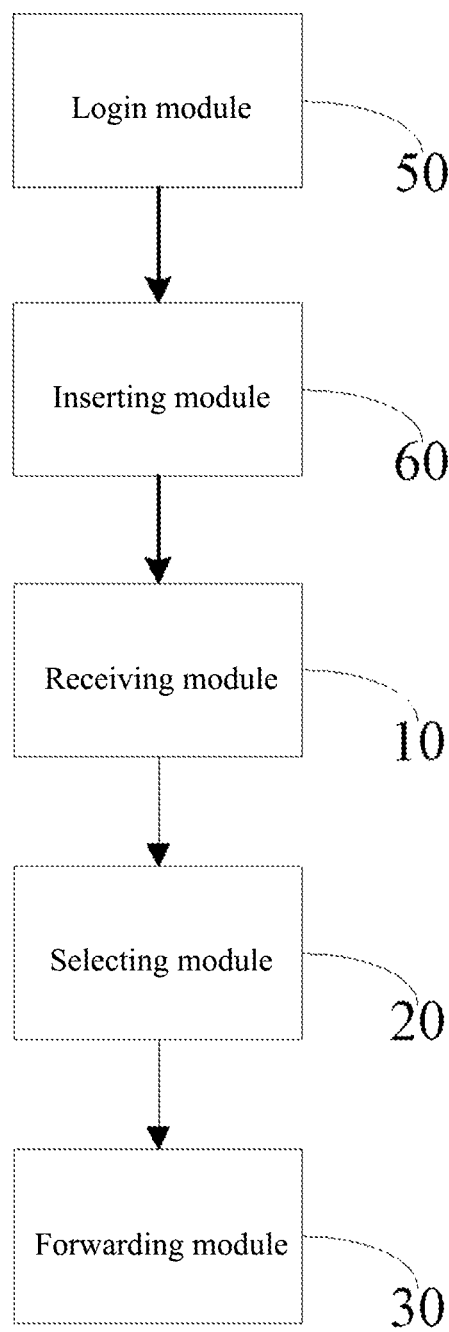
FIG. 5 is a block diagram of a M2M platform in accordance with one embodiment of the present invention.

Referring to FIG. 5, a M2M platform in accordance with one embodiment of the present invention is shown and comprises:

a receiving module 10 configured to receive a service request sent by a terminal;

a selecting module 20 configured to select a corresponding application according to capacity required by the service request; and a forwarding module 30 is configured to forward the service request to the corresponding application and feed back a response result of the application to the terminal.

Figure 6:
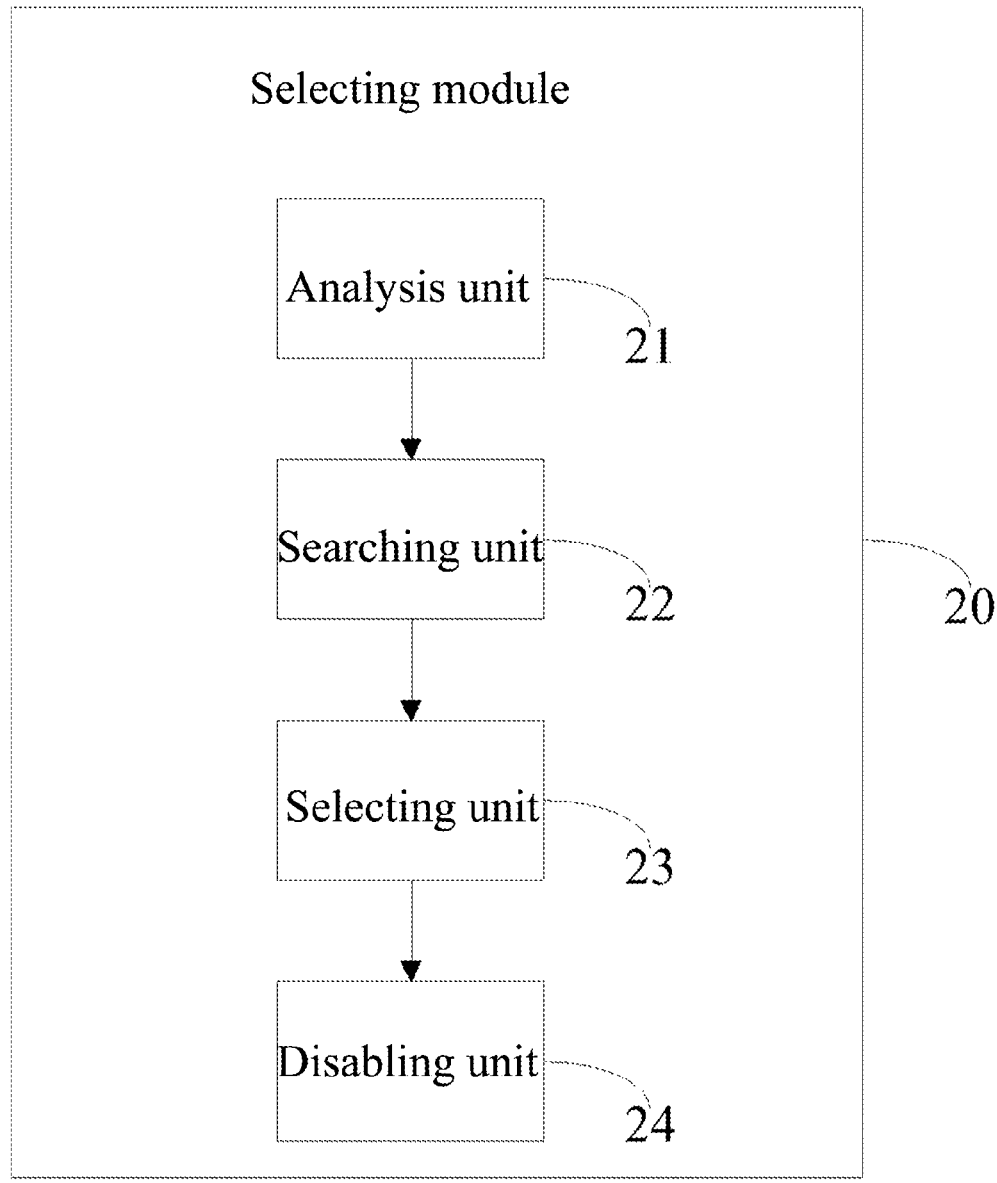
FIG. 6 is a block diagram of a selecting module of a M2M platform in accordance with one embodiment of the present invention.

Referring to FIG. 6, the selecting module 20 comprises:

an analysis unit 21 configured to analyze the capacity required by the service request; and a searching unit 22 configured to search the corresponding application from a queue of the capacity;

a selecting unit 23 configured to select the corresponding application according to weight or load balancing when there is a plurality of corresponding applications; and a disabling unit 24 configured to, when the selected corresponding application fails, disable the application until the application returns to normal, and select a spare application.

The capacity includes bearing capacity and/or service capacity and/or processing capacity.

One embodiment of the present invention further provides a M2M platform in accordance with another embodiment, which, in addition to the modules described in the aforementioned embodiment, also comprises:

a login module 50 configured to receive a login request initiated by the application, the login request including the capacity supported by the application; and an inserting module 60 configured to insert the application into the queue of the capacity supported by the application.

The working principle of a M2M platform in accordance with an embodiment of the present invention will be described in detail hereinafter.

An administrator of a M2M Platform predefines a set of capacities of various applications, which can comprise a plurality of subsets, such as, bearing capacity (IP-based, short messages-based, and the like), service capacity (a list of processable service capacity) and processing performance (the number of short messages processed, the number of service requests processed).

The login module 50 receives a login request initiated by an application, and capacity supported by the application is carried in the login request.

The inserting module 60 inserts the application into a queue of the corresponding capacity according to the capacity supported by the application. The inserting module 60 assigns the default capacity, which is predefined, to the application if the capacity is not contained in the application upon login, and then inserts the application into the queue of the corresponding capacity, and inserts the application into the queue of each capacity if the application has many capacities.

The receiving module 10 receives a service request (service type, bearing type, priority weight and so like) initiated by a terminal, and the analysis unit 21 of the selecting module 20 determines the required capacity (service capacity, bearing capacity, processing performance and so like) according to the service request.

The searching unit 22 acquires a set of applications from the queue of the corresponding capacity according to the required capacity, and the selecting unit 23 selects the application meeting the requirement according to a selection algorithm. When there is a one-to-one corresponding relationship between the service request and the selected application, the searching unit 22 selects the application normally to process the service request so as to satisfy service requests of the terminal most appropriately. When there is a one-to-many corresponding relationship between the service request and the selected applications, the selecting unit 23 can select an application meeting the requirement according to weight ranking of the application such as biding ranking or application load capacity ranking of a provider of the application.

When the selected application is disabled (link breaking, no response, overload threshold), the disabling unit 24 can further extract the required capacity based on the service request, and select an application from a queue of the capacity as a spare application. In the case that the selected application fails, the disabling unit 24 can disable this application from the queue of the capacity to guarantee that the failed application is no longer selected until the application returns to normal when subsequent service requests are processed.

The searching unit 22 refuses the service request of the terminal if no application meeting the service request is selected.

If an appropriate application is selected, the forwarding module 30 sends a service request to the corresponding application.

The application returns a response (Ack) message of processing result of the service request.

The forwarding module 30 sends a response to the service request to the terminal according to the response result of the application.

Referring to FIG. 4, a typical case of this embodiment is further described. The receiving module 30 receives Service request 1 initiated by the terminal initiates, and the analysis unit 21 of the selecting module 20 determines the required capacity according to Service request 1. Service request 1 in this embodiment needs three capacities, water charge query, TCP (Transmission Control Protocol) bearing and tariff priority. According to the requirements for the three capacities, the searching unit 22 acquires a set of applications, i.e., Application 1 and Application 4, from the queue of the corresponding capacity, and the selecting unit 23 selects Application 1 meeting the requirements based on the selection algorithm.

The forwarding module 30 sends Service request 1 to Application 1, which returns a response (Ack) message of processing result of the service request after receiving Service request 1. The forwarding module 30 sends a response to the terminal according to the response to Application 1.

The M2M platform services in accordance with the embodiments of the present invention can process a service request by selecting an appropriate application from a queue of capacity such that a terminal can uses a variety of applications.

The above description is only the preferred embodiments of the present invention and is not intended to limit the patent scope of the present invention. Any transformation of equivalent structures or equivalent procedures made using the specification and the accompanying drawings of the present invention or applied in other relevant technical fields directly or indirectly should be covered within the protection scope of the present invention likewise.

What is claimed is:

1. A method for processing Operation and support M2M platform services of Internet of Things comprising:
    predefining sets of capacity of various applications, and respectively inserting the various applications into a corresponding set of capacity according to the capacity supported by each of the various applications;
    receiving a service request sent by a terminal;
    analyzing the capacity required by the service request, and selecting a corresponding application from the corresponding set of capacity according to the capacity required by the service request; and
    forwarding the service request to the corresponding application, and feeding back a response result of the corresponding application to the terminal.

2. The method according to claim 1, wherein selecting a corresponding application according to the capacity required by the service request comprises:
   selecting the corresponding application according to weight or load balancing when there is a plurality of corresponding applications; and
   when the selected corresponding application fails, disabling the application until the application returns to normal, and selecting a spare application.

3. The method according to claim 1, wherein the sets of capacity include at least one of a set of bearing capacity, a set of service capacity and a set of processing capacity.

4. The method according to claim 1, further comprising:
   receiving a login request initiated by an application, the login request including the capacity supported by the application; and
   inserting the application into the set of capacity supported by the application.

5. A M2M platform, comprising at least one processor executing the following steps:
   predefining sets of capacity of various applications, and respectively inserting the various applications into a corresponding set of capacity according to the capacity supported by each of the various applications;
   receiving a service request sent by a terminal;
   analyzing the capacity required by the service request, and selecting a corresponding application from the corresponding set of capacity according to the capacity required by the service request; and
   forwarding the service request to the corresponding application and feed back a response result of the corresponding application to the terminal.

6. The M2M platform according to claim 5, wherein selecting a corresponding application according to the capacity required by the service request comprises:
   selecting the corresponding application according to weight or load balancing when there is a plurality of corresponding applications; and
   when the selected corresponding application fails, disable the application until the application returns to normal, and select a spare application.

7. The M2M platform according to claim 5, wherein the sets of capacity include at least one of a set of bearing capacity, a set of service capacity and a set of processing capacity.

8. The M2M platform according to claim 5, further comprising:
   receiving a login request initiated by an application, the login request including the capacity supported by the application; and
   inserting the application into the set of capacity supported by the application.

* * * * *